United States Patent [19]

Schaller

[11] Patent Number: 5,670,045
[45] Date of Patent: Sep. 23, 1997

[54] LAUNDER COVER FOR USE IN A CLARIFIER TANK

[75] Inventor: Earle Schaller, Palm Beach Gardens, Fla.

[73] Assignee: NEFCO, Inc., Palm Beach Gardens, Fla.

[21] Appl. No.: 696,358

[22] Filed: Aug. 3, 1996

Related U.S. Application Data

[63] Continuation of Ser. No. 333,411, Nov. 2, 1994, abandoned.

[51] Int. Cl.$^6$ ............................................. B01D 21/24
[52] U.S. Cl. ........................ 210/540; 210/541; 210/528
[58] Field of Search ................................. 210/602, 800, 210/804, 600, 188, 539, 540, 541, 542, 513, 528; 220/565, 600, 660

[56] References Cited

U.S. PATENT DOCUMENTS

| | | | |
|---|---|---|---|
| 3,385,786 | 5/1968 | Klock | 210/602 |
| 4,380,748 | 4/1983 | Hall | 210/541 |
| 4,390,422 | 6/1983 | Mackrle et al. | 210/188 |
| 4,391,704 | 7/1983 | Anderson | 210/539 |
| 4,613,434 | 9/1986 | Määttä | 210/188 |
| 4,664,794 | 5/1987 | Mackrle et al. | 210/188 |
| 4,710,292 | 12/1987 | DuVos | 210/539 |
| 4,767,536 | 8/1988 | Roley | 210/539 |
| 5,227,077 | 7/1993 | Shea | 210/188 |
| 5,252,205 | 10/1993 | Schaller | 210/540 |
| 5,286,392 | 2/1994 | Shea | 210/188 |

*Primary Examiner*—Christopher Upton
*Attorney, Agent, or Firm*—Sofer & Haroun, LLP

[57] ABSTRACT

A cover apparatus for inhibiting the growth of algae on the fluid-contacting surfaces of a water treatment tank including a central influent, at least one substantially vertical peripheral wall having an upper and interior surface, a peripheral baffle having inside and outside surfaces, a substantially vertical weir, a spillway, and a launder channel having a width. The cover apparatus includes at least one panel member positionable over at least a portion of the launder channel to prevent light from reaching interior surfaces thereof. In a preferred embodiment of the present invention, a plurality of modular panel members are employed to cover substantially the entire launder channel, with each individual panel member being dimensioned to span at least the width of the launder channel and comprising a substantially opaque material.

17 Claims, 5 Drawing Sheets

LAUNDER COVER FOR USE IN A CLARIFIER TANK

This is a continuation of U.S. application Ser. No. 08/333,411, filed Nov. 2, 1994, now abandoned.

BACKGROUND OF THE INVENTION

The present invention relates generally to the cleaning of sewage treatment facilities and more particularly, to a cover system which inhibits the growth of algae on the surfaces of sedimentation water treatment tanks employed in such facilities.

The necessity for providing sewage treatment plants to clean and purify water discharged from homes and factories is well known. The function of a sewage treatment facility is to receive raw sewage (water containing waste material) as discharged from a city sewage system and clean it to ultimately produce purified water. This is accomplished through a series of biological and mechanical processes.

In a typical water treatment facility, the raw sewage is received from the sewage system and passed through a coarse screen to remove large pieces of matter. The sewage is next directed to one or more primary sedimentation tanks or clarifiers. The sewage remains in primary sedimentation for a period of time sufficient to allow the majority of the heavy matter to settle to the bottom of the tank forming sludge. This sludge is removed for "digestion" by microorganisms. The digested sludge is then dried and can be used as compost or fertilizer. The remaining liquid is treated in a second biological system to remove ammonia. The liquid from this treatment is then aerated and passed into final sedimentation water treatment tanks to remove any remaining solid material.

Water treatment tank configurations vary with each treatment facility application. This notwithstanding, most final sedimentation water treatment tanks are circular. This simplifies automatic skimming, churning and/or bottom scraping operations. More specifically, by eliminating inaccessible corners and providing uniform surfaces, a revolving scraper arm or skimmer blade can provide complete and efficient churning and prevent sludge buildup.

During operation of one type of water treatment tank, water containing sediment enters the center of the tank. In a continuous process, the lighter clean water is effectively decanted from the heavier sediment containing water. More particularly, the clean water is displaced from the tank by the constant flow of water containing sediment into the tank. The displaced clean water is forced to flow under a baffle plate for collecting floating scum and then over a weir, ultimately entering a clean water flow channel. The clean water flow channel directs the water to the next treatment stage where it is chlorinated and further made safe to be discharged into a river or stream.

Presently, algae growth in the trough or launder channel is a serious problem in clarifier tanks. Specifically, as algae builds up on the weirs of the clarifier tank, it can substantially interfere with the hydraulic flow therethrough. Algae typically adheres to the surfaces of the weir and the trough, where it becomes unsightly and odorous. When the launder is cleaned, however, the algae is often loosened and causes clogging of the downstream filters.

For many years, the removing of algae from the baffle, weir, spillway and clean water flow channel has been completed primarily by scrubbing the tank structure with brushes manipulated by hand. Because the final treatment tanks are quite large, this is a labor-intensive and tedious process, involving a large expenditure of man-hours. Additionally, the algae removing process must be done frequently, thereby further adding to the cost.

More recent proposals directed at the problem of algae growth have utilized mechanical brushes to automate the cleaning process. One such device is disclosed in U.S. Pat. No. 4,830,748. While this apparatus is somewhat effective in cleaning the baffle, weir, spillway and clean water flow channel of a circular tank, it is somewhat limited in application in that it is adapted to be mounted to a revolving skimmer blade. Accordingly, it can only be effectively utilized with circular water treatment tanks incorporating such a blade. The cost of obtaining, installing, and maintaining such an automated system, though perhaps preferable to the alternative of periodic manual scrubbing, is also quite high. Other waste water facilities have utilized chlorine and other chemicals in sufficient concentrations to kill the algae. However, a large number of waste water facilities utilize a denitrification process that precludes the use of such chemical additives. As such, a need is recognized for a proactive system that inhibits the growth of algae in the launder channel of a clarifier tank.

SUMMARY OF THE INVENTION

It is, therefore, an object of the present invention to provide a cover system which is positionable over selected portions of the clarifier tank to prevent sunlight from reaching the surfaces of the launder channel. By blocking the sunlight, the cover system of the present invention inhibits the growth of algae on the surfaces of the launder channel and obviates the need for frequent scrubbing or complex automated cleaning devices.

The inventive cover system comprises at least one panel member positionable above the channel, weir, and sometimes partially over scum baffle of a clarifier tank to prevent sunlight from reaching the surfaces thereof. In accordance with an illustrative embodiment of the present invention intended for use with a circular clarifier tank, one or more panel members having an outer radius of curvature corresponding to the radius of curvature of the tank may be employed so that the outer edge of the panel member or members may be arranged in a contiguous fashion along the inwardly facing wall of the tank and secured thereto at selected intervals. Where a plurality of panel members are employed, they may be mounted in an end to end abutting fashion such that the lateral side of each cover abuts a lateral side of an adjacent cover. In this manner, the panel members may be arranged over an entire launder channel to substantially prevent light from reaching the interior surfaces thereof. The cover system of the present invention has application to other tank configurations, such, for example, as those possessing a rectangular cross section.

Referring to the mounting of the panel member in an end to end abutting fashion, the adjacent-abutting panel members form a smoothly-continuous surface by virtue of a shiplap-type joint through which each panel member are interconnected. This shiplap-type joint allows for the first lateral side of the panel member to be secured to the next adjacent one of said plural panel members so that together they form the smoothly-continuous surface.

A method for inhibiting the growth of algae on fluid contacting surfaces of a water treatment tank is also provided. Typically, water treatment tanks include a central influent, at least one substantially vertical peripheral wall having an upper and interior surface, a peripheral baffle having inside and outside surfaces, a substantially vertical weir, a spillway, and a launder channel having a width. The method of inhibiting the growth of algae includes the step of securing to the peripheral tank wall, a first panel member positionable over at least a portion of the launder channel, for preventing light from reaching interior surfaces thereof. The first panel member is dimensioned and arranged to span the width of said launder channel and is comprised of a substantially opaque material. Thereafter, a second panel member is secured to the peripheral tank wall, the second panel member being positionable over at least a portion of the launder channel, for preventing light from reaching interior surfaces thereof. Similar to the first panel member, the second panel member is dimensioned and arranged to span the width of the launder channel and is comprised of a substantially opaque material. The second panel member is secured in end-to-end immediately-adjacent relation to said first panel member.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numbers denote similar elements throughout the several views.

DETAILED DESCRIPTION OF THE PRESENTLY PREFERRED EMBODIMENTS

Figure 1:
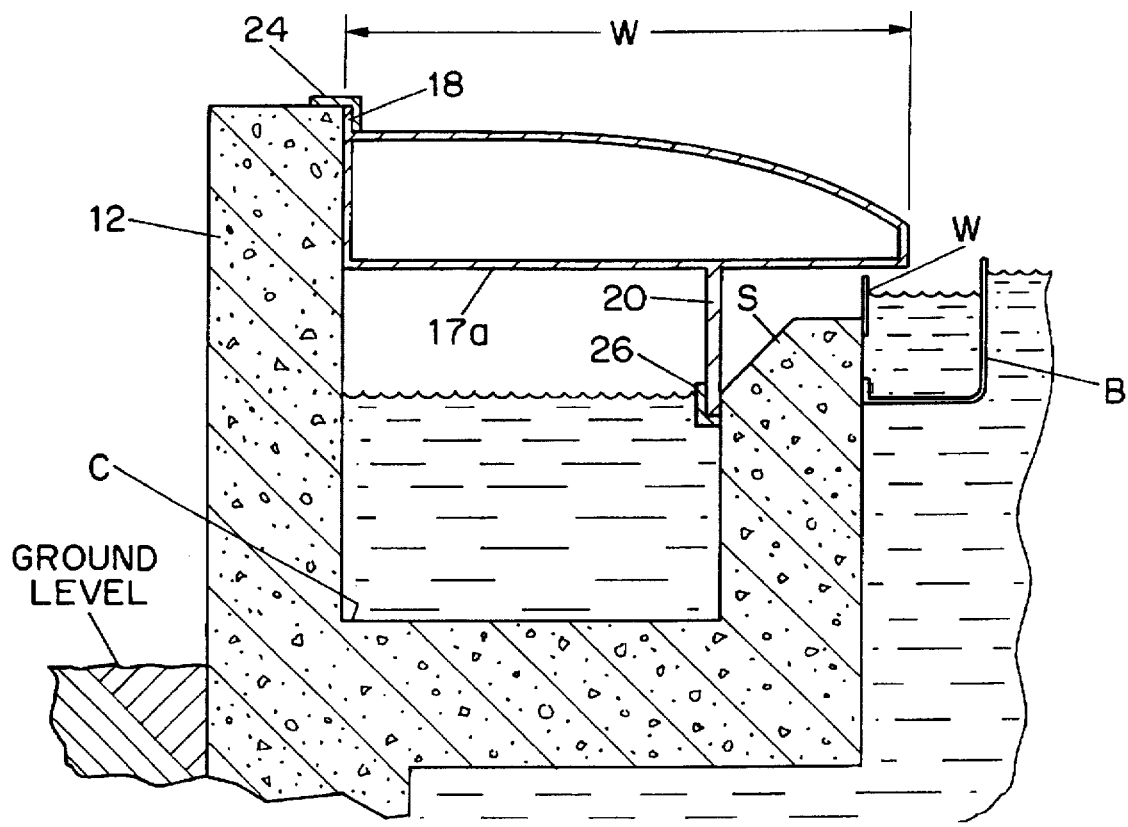
FIG. 1 is a cutaway sectional view of a clarifier tank showing a cover panel member constructed in accordance with an illustrative embodiment of the present invention positioned thereon.

Reference is now made to FIG. 1 showing the cover system 10 of the present invention installed over the clean water flow or launder channel C of a final sedimentation water treatment tank 12. In the illustrative embodiment depicted in FIG. 1, system 10 is configured as a modular assembly of individual panel members 14, only one of which panel members is shown. In accordance with the present invention, each panel member 14 is securable to tank 12 and, when installed in the position shown in FIG. 1, is dimensioned to completely cover the launder channel C, the spillway S, the weir gate W, and scum baffle B.

As discussed previously, a principal object of the present invention is to prevent the growth of algae on the interior surfaces of the launder channel, weir, spillway and baffle. To this end, each panel member as panel member 14 comprises an opaque material which reflects and/or absorbs substantially all light incident thereon. In this regard, it will be readily appreciated that a wide variety of rigid or flexible materials may be utilized for the construction of the panel members. The panel members may, for example, be formed from metal or alloys thereof, fiberglass, or from substantially opaque thermosetting or thermoplastic materials. It is also possible, of course, to make the panel member opaque by applying a suitable coating, such as a light reflective or absorptive coating, to the exterior and/or interior surfaces thereof. In so doing, it is possible to utilize even transparent or translucent plastic materials to fabricate the panel members of the present invention.

Figure 2:
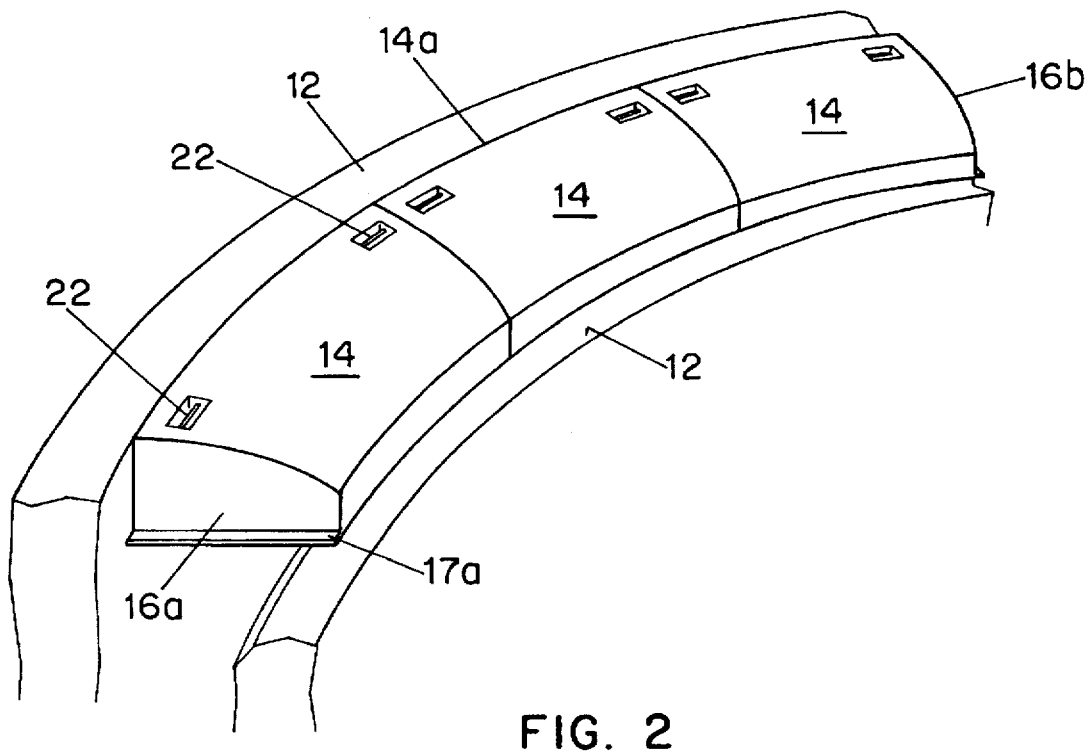
FIG. 2 is a partial perspective view depicting an arrangement of cover panel members along the perimeter of a generally arcuate clarifier tank in accordance with the embodiment of FIG. 1.

With reference now to FIG. 2, it will be seen that the panel members 14 of cover system 10 may be dimensioned and contoured to achieve a contiguous relationship with the interior surface of the clarifier tank and with each other. In the illustrative embodiment of the present invention depicted in FIGS. 1–3, the clarifier tank has a circular sidewall configuration. Accordingly, each panel member 14 defines an exterior edge surface 14a having a radius of curvature corresponding to the radius of curvature of the tank. Moreover, the lateral side surfaces 16a, 16b of panel member 14 diverge in a direction toward exterior edge surface 14a so that adjacent panel members may be mounted in an end to end abutting fashion.

Figure 3:
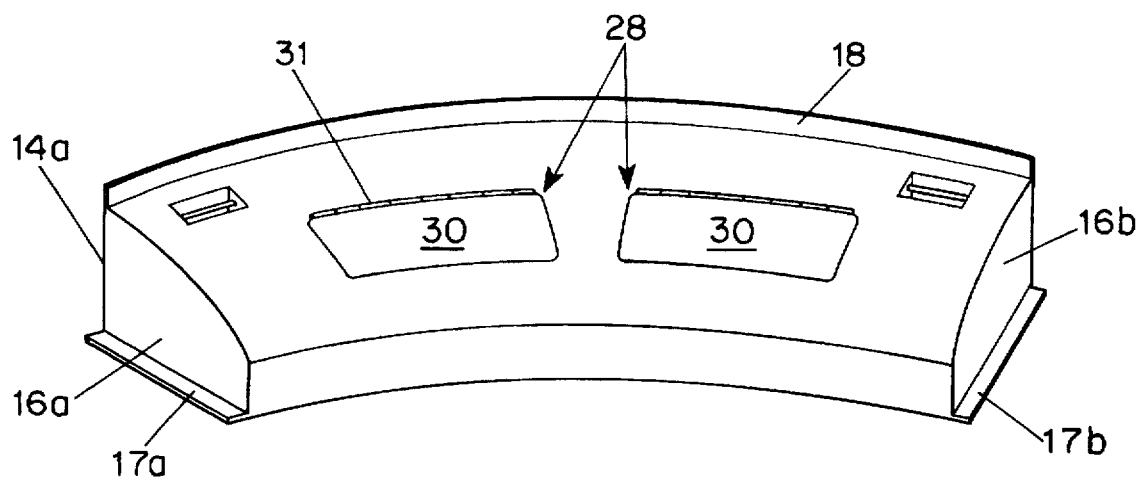
FIG. 3 is a perspective view of the cover panel member of FIG. 1.

To prevent light from entering the channel between the adjacent lateral edge surfaces of abutting panel members, lateral overlapping regions 17a and 17b are provided (FIG. 3). When panel members 14 are assembled in the manner shown in FIG. 2, a cover system is formed which extends substantially around the entire clarifier tank over the launder channel. Light is thereby prevented from reaching the interior surfaces of the launder channel, spillway, weir, and baffle.

In a currently preferred implementation, the individual covers are fabricated from a molded reinforced fiberglass composite as a one piece, unitarily-integrated unit. Thus, each molded cover incorporates the panel member, and, if desired, an end bracket or flange to facilitate securing of the panel member to the clarifier tank. Advantageously, this enables significant reductions in both manufacturing time and for installation as compared to other prior art arrangements and systems. Most preferably, the thickness of the fiberglass panels is in the range of about 3/16 to 3/4 of an inch, a range that provides substantial structural strength and rigidity while remaining sufficiently light weight for unusual ease of installation. Each panel member 14 can also be provided with a network of cross braces or other strengthening members (not shown) to enhance the rigidity to each panel member and provide a walkway surface capable of supporting one or more maintenance workers. Typically, such cross braces or other strengthening members can be fabricated out of a lightweight material such as balsa wood which can then be sandwiched between two or more layers of fiberglass. If desired, the upper surface of each panel member may be provided with a roughened, non-skid texture to prevent injury to such workers.

As will be readily appreciated by those skilled in the art, a variety of fastening devices and techniques may be used to secure panel members 14 in position over the launder channel C. In the embodiment shown in FIG. 1, panel member 14 incorporates an upwardly extending, mounting flange portion 18 having an exterior surface contoured for contiguous engagement with the interior, circumferential surface of clarifier tank 12. Mounting flange portion 18 may be secured directly to the peripheral wall of the clarifier tank using conventional mechanical fasteners at radially spaced intervals.

As seen in FIG. 1, it will be seen that each panel member 14 may also be provided with one or more mounting flange portions 20 having a radius of curvature corresponding to that of the substantially vertical, inner surface of weir W. Of course, the length of flange portions 20 must be relatively short so as not to substantially obstruct the flow of clean water over the weir. When secured to weir W by appropriate fastening means, second mounting flange portions 20 maintain the lower edge of panel member 14 in fixed position relative to the launder channel and thus the panel member 14 is mounted in cantilever fashion over the weir and spillway. Advantageously, the second mounting flange portions 20 may be provided with a vertical arrangement of slots or grooves (not shown) to allow vertical adjustment relative to the weir and, thus, adjustment of the panel member 14. In this way, the horizontal axis of the panel members can be adjusted if desired.

The top surface of each panel member may be provided with handle means, such as recessed regions 22 (FIG. 2) for facilitating the installation or removal of the cover. Service personnel may thus easily remove the covers by hand to access the launder channel for regular scheduled maintenance. When it is anticipated that frequent access to the channel may be required, the cover can be secured to the interior wall or other surfaces of tank 12 and/or the weir W by a series of corrosion resistant retaining members.

In the illustrative embodiment of FIGS. 1-3, the retaining members are configured as resilient clips which act to secure each cover over the channel in much the same way as the previously described upper and lower mounting flanges. A plurality of upper clips, only one of which—generally indicated at 24—is shown, are mounted on the peripheral wall and are engageable with an upwardly extending portion of panel member 14. Illustratively, clips 24 may be dimensioned and arranged to receive the upper flange portion 18, as shown in FIG. 1. In a similar manner, a plurality of lower clips, only one of which—generally indicated at 26—are mounted proximate the weir and engageable with a downwardly depending portion of panel member 14. By way of particular example, clips 26 may be dimensioned and arranged to receive the lower flange portion of panel member 14. It will, however, be readily ascertained by those skilled in the art that the panel members need not include the upper and lower flange structures discussed above and that various clip engageable surface portions may be utilized for the purpose of retaining the panel members in an easily removed condition in accordance with the teachings of the present invention. For example, clips dimensioned and arranged to receive a lower portion of the exterior edge surface 14a may be secured to the interior surface of the peripheral wall of tank 12. Such a configuration would permit each panel member 14 to be secured to the peripheral wall in a cantilevered fashion over the surface of the launder channel.

Figure 8:
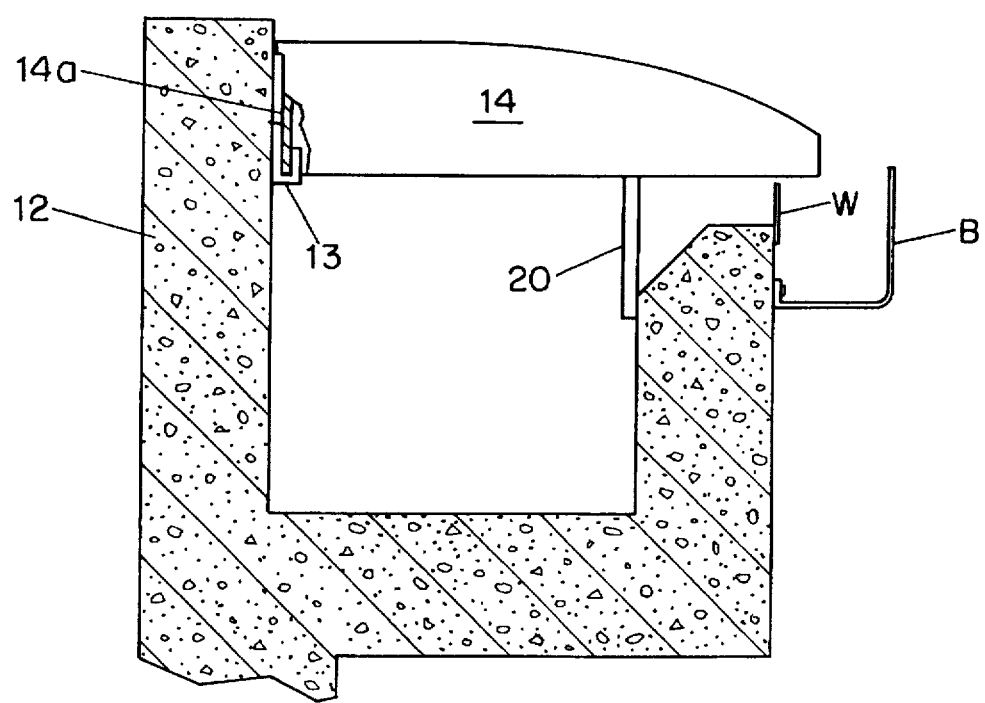
FIG. 8 is a cross-sectional view of a cover member configured in accordance with a further illustrative embodiment of the present invention positioned thereon.
Figures 9A, 9B:
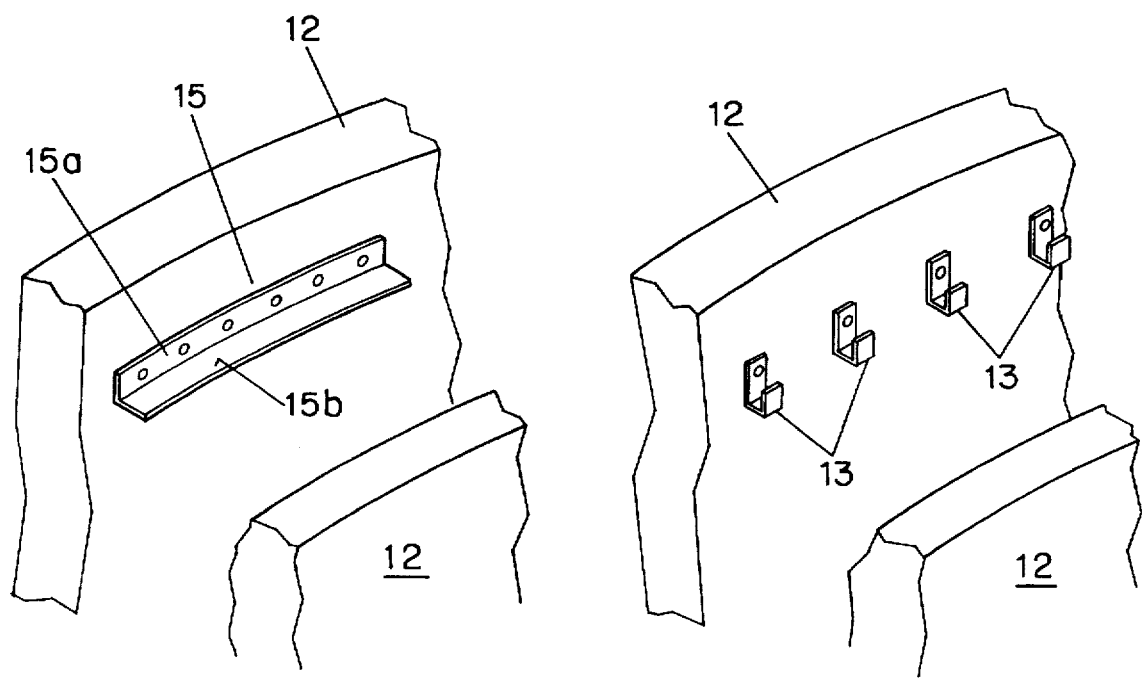
FIG. 9A is a perspective view of a molded mounting flange having a radius of curvature substantially equal to the peripheral tank wall.
FIG. 9B is a perspective view of a plurality of resilient clips which act to secure each cover over the channel.

As shown in FIGS. 8 and 9B, clips 13 are dimensioned and arranged to receive a lower portion of the exterior edge surface 14a may be secured to the interior surface of the peripheral wall of tank 12. Similar to the embodiment described above, such a configuration would permit each panel member to be secured to the peripheral wall 12 in a cantilevered fashion over the surface of the launder channel.

To effect removal of the panel member of FIG. 1, handles 22 are grasped and an upward vertical force is applied in order to disengage both the upper and lower edges of the cover from retaining members 24, 26. As best seen in FIG. 3, the upper surface of each panel member may also be provided with one or more covered access ports 28 to facilitate inspection of the launder channel. Illustratively, the access ports 28 may be configured as doors 30 which are provided with a hinging means 31 to facilitate service and inspection.

Figure 4:
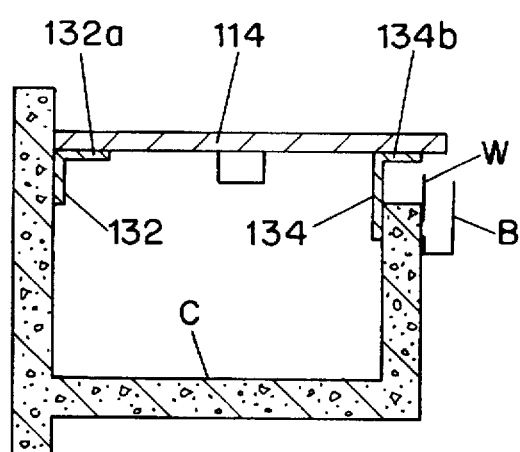
FIG. 4 is a cross sectional side view of a cover panel member constructed in accordance with another embodiment of the present invention and installed over a launder channel.
Figure 5:
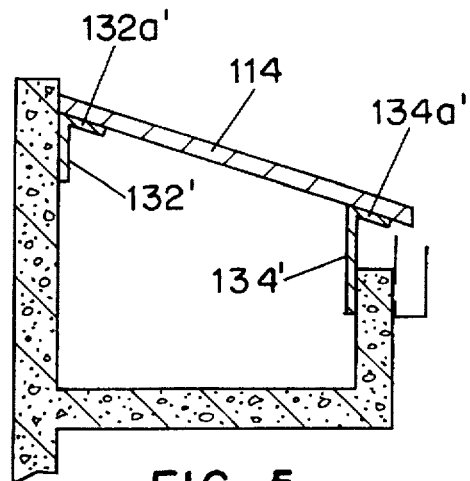
FIG. 5 is a cross sectional side view of the cover panel member of FIG. 4 shown installed at a downwardly sloping incline.
Figure 6:
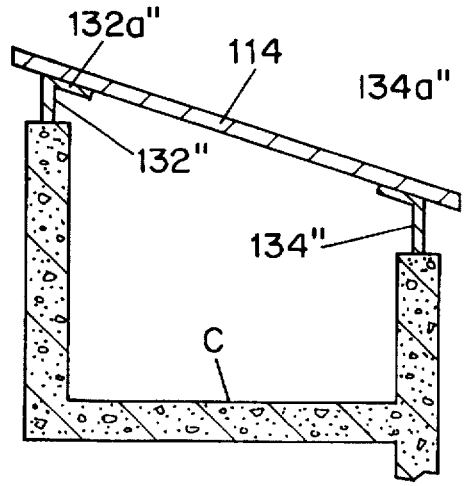
FIG. 6 is a cross sectional side view of the cover member of FIG. 4 shown installed at a downwardly sloping incline utilizing a modified support structure.

With reference now to FIGS. 4–6, there is shown in cross section a modular panel member 114 constructed in accordance with an alternate embodiment of the present invention. As seen in FIG. 4, panel member 114 has a substantially planar upper and lower surface and is secured to opposed interior surfaces of launder channel C by fixed supports 132 and 134. Supports 132 and 134 define upper supporting surfaces 132a, 134a which may be provided with suitable apertures to accommodate the insertion of suitable mechanical fasteners. As shown in FIG. 5, supports 132', 134', which define downwardly inclined upper support surfaces 132a', 134a', may be utilized if it is desired to mount panel member 114 in a downwardly inclined orientation. Alternatively, and as shown in FIG. 6, supports 132" and 134", which define downwardly inclined upper support surfaces 132a" and, 134a" respectively, may be utilized to mount panel member 114 in a downwardly inclined orientation.

Figure 7:
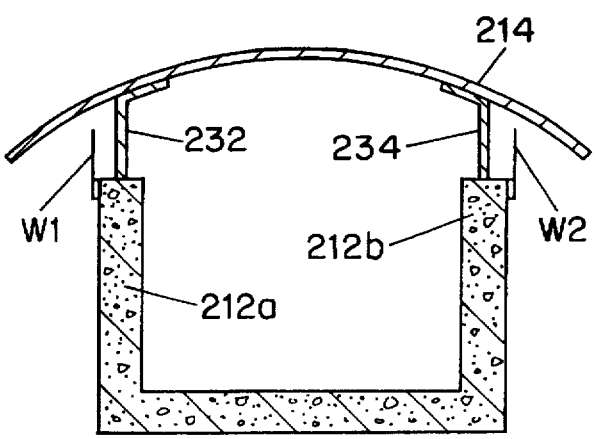
FIG. 7 is a cross-sectional view of a cover member configured for installation over a dual-weir launder channel in accordance with a further embodiment of the present invention.

In FIG. 7, a modified embodiment of the present invention is shown. In this embodiment, panel member 214 is configured specifically for mounting over a dual weir launder trough. In accordance with this embodiment of the present invention, the trough C is defined by first and second sidewalls 212a, 212b and is bounded on either side by corresponding first and second weirs $W_1$ and $W_2$. Panel member 214 may be secured in position above trough C using any suitable securing means. In the illustrative embodiment of FIG. 7, the upper and lower surfaces of panel member 214 are provided with an upwardly converging contour. Accordingly, support members 232 and 234, defining correspondingly contoured supporting surfaces 232a and 234a, may be utilized to secure the panel members in position.

In FIG. 8, resilient clips 13 are provided and which act to secure each cover 14 over the channel in much the same way as the previously described upper and lower mounting flanges. A plurality of lower clips 13, only one of which—generally indicated at 13—is shown in FIG. 9B, are mounted on the peripheral wall and are engageable with an downwardly extending portion of panel member 14. Illustratively, clips 13 may be dimensioned and arranged to receive the lower portion of the exterior edge surface 14a. By utilizing the flange portion 20 described earlier, such a configuration would permit each panel member 14 to be secured to the peripheral wall in a cantilevered fashion over the surface of the launder channel.

As shown in FIG. 9A, a mounting flange 15 is provided having a radius of curvature corresponding to that of the substantially vertical, peripheral wall of tank 12. Of course, the length of flange portions 15 can be variable but preferable is the length of the cover so as to fully support the cover 14. Specifically, the mounting flange which can be fabricated out of the same material as the cover such a fiberglass, has a first portion 15a that can be secured to the peripheral wall of tank 12 by a appropriate fastening means such as bolts, screws, rivets of the like. When secured to the peripheral wall by a appropriate fastening means, the second portion 15b is adapted to receive and support the lower portion of the exterior edge surface 14a. Thus, the cover 14 may be secured to the interior surface of the peripheral wall of tank 12.

Figure 10:
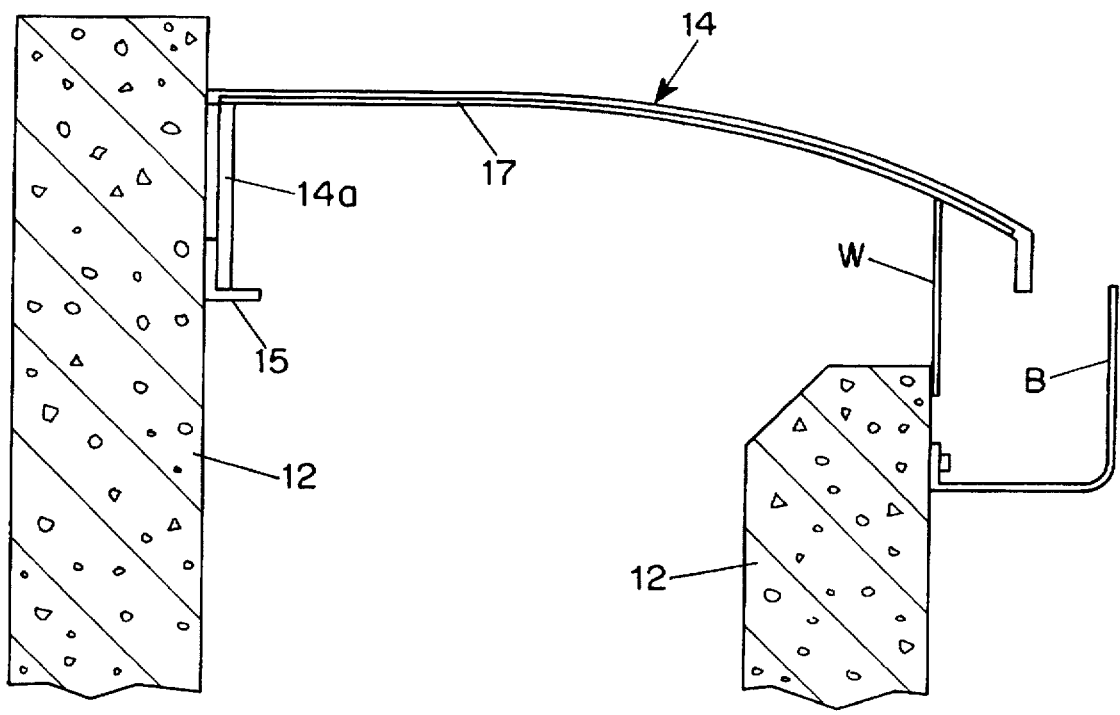
FIG. 10 is a side view of a clarifier tank showing a cover panel member constructed in accordance with an illustrative embodiment of the present invention positioned thereon.
Figure 11:
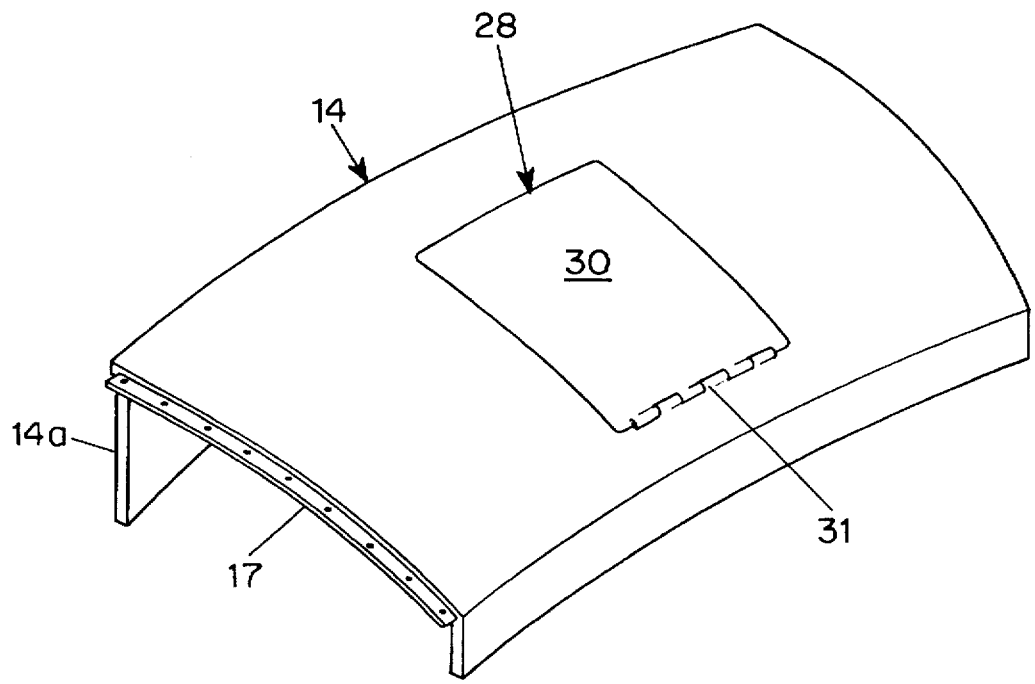
FIG. 11 is a perspective view of the cover panel as shown in FIG. 10.

As shown in FIGS. 10 and 11, each panel member 14 may also be provided with a shiplap-type joint 17 integrally molded into the panel member 14 so that the adjacent-abutting panel members (not shown) form a smoothly-continuous surface by virtue of it shiplap-type joint through which each panel member 14 are interconnected. This shiplap-type joint 17 allows for the first lateral side of the panel member 14 to be secured to the next adjacent one of said plural panel members (not shown) so that together they form the smoothly-continuous surface. When utilizing this structure, lateral side surfaces 16a (FIG. 2) are preferably not provided, thus allowing for further weight and cost reductions. Moreover, the overlapping of the lateral sides of the panel member 14 prevents unintended leakage or passage of fine particulate matter through the connection between the immediately-adjacent panel members. And still further, this overlap advantageously permits appropriate adjustment, during installation of the inventive cover system, of the relative positions of adjacently-disposed baffle members to compensate.

Figure 12:
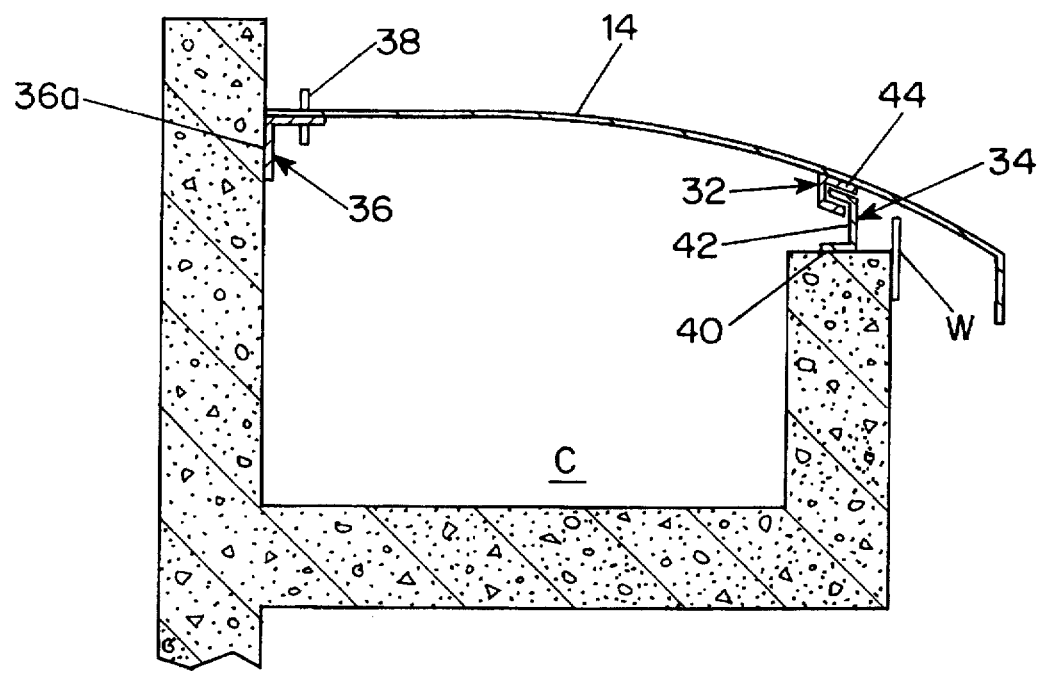
FIG. 12 is a cross sectional side view of a further embodiment of the cover panel member shown installed at a downwardly sloping incline.
Figure 13:
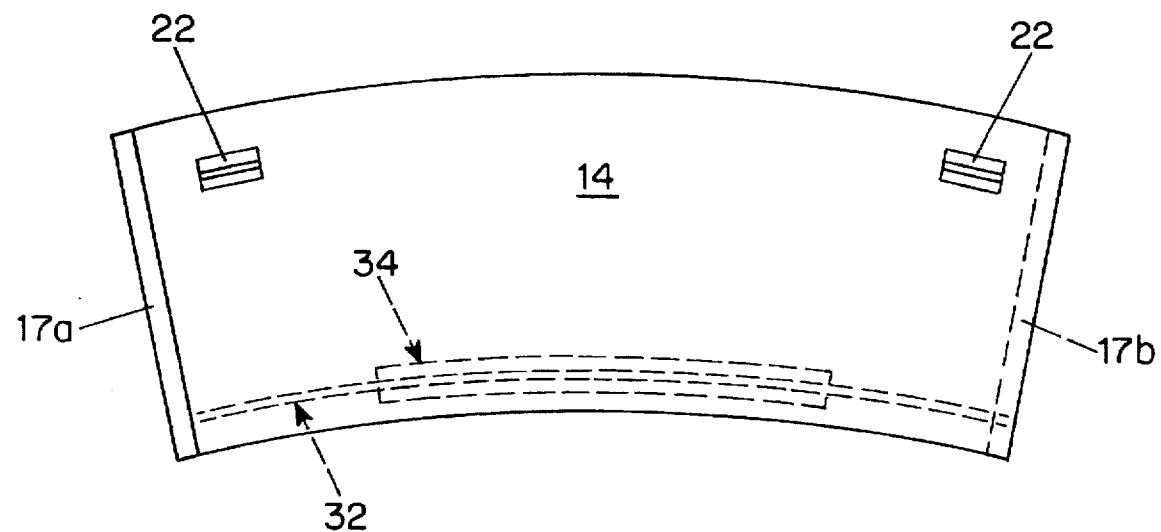
FIG. 13 is a top view of the cover member of FIG. 12.

FIGS. 12 and 13 show a further embodiment of an individual cover which is fabricated from a molded reinforced fiberglass composite as a one piece, unitarily-integrated unit. Each molded cover incorporates the panel member 14, and, a substantially U-shaped pivot flange 32 which facilitates the securement of the panel member 14 to the clarifier tank weir wall. This U-shaped pivot flange 32 may be integrally molded into the fiberglass panel member 14.

A substantially U-shaped resting flange 34 is also provided. This flange 34 has a first mounting surface 40 which is secured to the upper portion of the weir wall, a second vertical surface 42 which extends vertically above the weir wall and a third resting surface 44 which provides a resting point for the integrally molded U-shaped pivot flange 32 and which provides support for the lower portion of the panel member 14. As shown in FIG. 12, the opening of the U-shaped pivot flange 34 faces toward the peripheral tank wall with the opening of the U-shaped pivot flange 32 facing toward the center of the tank. Although, the use of two oppositely facing U-shaped flanges 32, 34 is currently described as a pivot means, it will be understood that any type of pivoting means may be provided as will be readily appreciated by those skilled in the art.

An angled mounting flange 36, which has a substantially vertical side 36a secured to the peripheral wall of the clarifier tank has a substantially horizontal side 36b which provides support for the upper portion of the panel member 14. Removable quick release clips, pins or fasteners 38 may be utilized so that the upper portion of the panel member 14 may be quickly disengaged from the horizontal portion of the mounting flange 36, thus allowing the panel member 14 to pivot about the U-shaped resting flange 34 so as to provide ease of access to the launder channel C. Such a pin 38 may be insertable through a hole as shown in the panel member 14 and through a similar sized hole in the horizontal side tab of the mounted flanges 36. As will be understood any number of pins or fastener 38 may be utilized with an individual panel member 14. By utilizing such an arrangement, this enables significant reductions in both installation and maintenance as compared to other prior art arrangements and systems.

Similar to the embodiments described above, this panel member 14 is provided with lateral overlapping regions 17a and 17b as well as the previously mentioned features to prevent light from entering the channel thus inhibiting the growth of algae on fluid contacting surfaces in the launder channel. Accordingly, when the panel members 14 are assembled in the manner shown in FIG. 2, a cover system is formed which extends substantially around the entire clarifier tank over the launder channel. Light is thereby prevented from reaching the interior surfaces of the launder channel, spillway, weir and baffle.

The top surface of each panel member 14 may be provided with handle means, such as recessed regions 22 (FIG. 13) for facilitating the installation or removal of the cover. Service personnel may thus easily remove the pins 38, pivoting the covers by hand about the pivot flange 34 to access the launder channel for regular scheduled maintenance.

It would be understood that the preferred embodiments and examples described are for illustrative purposes only and are not to be construed as limiting the scope of the present invention which is properly delineated only in the appended claims.

What is claimed is:

1. In a water treatment tank apparatus including an influent, at least one substantially vertical peripheral wall having an upper and an interior surface, a substantially vertical weir connected to said vertical peripheral wall, and a launder channel having a width, the improvement comprising:

cover means, including at least one panel member, said cover means having first and second ends, said first end being secured to the tank and said second end positioned over at least a portion of the launder channel and radially outwards from said vertical weir, for preventing light from reaching interior surfaces thereof, said at least one panel member being dimensioned to span the width of said launder channel and being comprised of a substantially opaque material, whereby the growth of algae on fluid contacting surfaces of the launder channel is inhibited;

support means coupled to said tank wall for supporting said first end of said cover means;

a support flange for supporting said panel member at said substantially vertical wall so that said second end of said cover means is cantilevered over said vertical weir and terminates at a free end, said support flange having a first end and a second end distal to said first end, said first end secured to said launder channel; and pivot means coupled to said second end of said support flange and to said panel member for pivoting said panel member away from said tank wall about a pivot axis between a first closed position and a second open position so as to allow access for cleaning of said launder channel.

2. The apparatus of claim 1, wherein said panel member is dimensioned to span the width of said launder channel and to cover said vertical weir.

3. The apparatus of claim 1, wherein said cover means comprises a plurality of panel members, each of said panel members defining a first lateral surface, a second lateral surface, an interior edge surface and an exterior edge surface.

4. The apparatus of claim 3, wherein the tank is substantially circular and the exterior edge surface of each panel member defines a radius of curvature corresponding to that of the peripheral wall of the tank for contiguous engagement therewith.

5. The apparatus of claim 1, wherein said water treatment tank apparatus further includes a peripheral scum baffle having inside and outside surfaces, wherein said second end of said panel member is positioned between said vertical weir and said peripheral scum baffle.

6. The apparatus of claim 1, wherein said pivot means further comprises a hinge.

7. The apparatus of claim 1 wherein said support means comprises an angled mounting flange, said angled mounting flange having a substantially vertical side secured to said peripheral wall of said tank and a substantially horizontal side for providing support for the upper portion of said panel member.

8. The apparatus of claim 1, wherein said support means further comprises means for releasably securing said first end of said to said tank.

9. The apparatus of claim 8, wherein said means for releasably securing said first end to said tank comprises removable quick release pins so that the upper portion of said panel member may be disengaged from said tank wall to allow said panel member to pivot about said pivot means so as to provide access to said launder channel.

10. The apparatus of claim 1, wherein said cover means is fabricated from a molded reinforced fiberglass composite as a one-piece, unitarily integrated unit.

11. The apparatus of claim 1, wherein said cover means and said support flange are fabricated from a molded reinforced fiberglass composite as a one-piece, unitarily integrated unit.

12. A cover system for use in a water treatment tank apparatus having an influent, at least one substantially vertical peripheral wall having an upper and interior surface, a peripheral scum baffle having inside and outside surfaces, a substantially vertical weir connected to said vertical peripheral wall, a spillway, and a launder channel having a width, said cover system comprising:

a plurality of launder covers, each including at least one panel member, said cover means having first and second ends, said first end being secured to the tank and said second end positioned over at least a portion of the launder channel and radially outwards from said vertical weir, for preventing light from reaching interior surfaces thereof, said at least one panel member being dimensioned to span the width of said launder channel and being comprised of a substantially opaque material, whereby the growth of algae on fluid contacting surfaces of the launder channel is inhibited;

support means coupled to said tank wall for supporting said first end of said cover means;

a support flange for supporting said panel member at said substantially vertical wall so that said second end of said cover means is cantilevered over said vertical weir and terminates at a free end, said support flange having a first end and a second end distal to said first end, said first end secured to said launder channel; and pivot means coupled to said second end of said support flange and to said panel member for pivoting said cover means about said pivot axis between a first closed position and a second open position so as to allow access for cleaning of said launder channel;

said plural covers being secured together such that a second side of a first launder cover is secured to a first side of a next adjacent one of said launder covers to form a cover system extending about the launder channel.

13. The apparatus of claim 12, wherein said panel member is fabricated from a molded reinforced fiberglass composite as a one-piece, unitarily integrated unit.

14. The apparatus of claim 12, wherein said pivot means further comprises a pivot flange and a resting flange wherein said pivot and resting flanges are U-shaped.

15. The apparatus of claim 14, wherein said pivot flange is integrally molded into said panel member.

16. The apparatus of claim 12, further comprising fastening means for releasably disengaging said cover means from said support means such that said panel member is permitted to pivot about said pivot axis so as to provide ease of access to said launder channel.

17. In a water treatment tank apparatus including an influent, a centrally mounted launder channel, said launder channel having a first weir end and a second weir end, a substantially vertical first weir connected to said first weir end, a substantially vertical second weir connected to said second weir end, said launder channel having a width, the improvement comprising:

cover means, including at least one panel member, said cover means having first and second ends, said first end of said cover means being secured to said first weir end and said second end of said cover means secured to said second weir end and over at least a portion of the launder channel and radially outwards from said first and second vertical weirs, for preventing light from reaching interior surfaces thereof, said at least one panel member being dimensioned to span the width of said launder channel and being comprised of a substantially opaque material, whereby the growth of algae on fluid contacting surfaces of the launder channel is inhibited;

first support means coupled to said first weir end for supporting said first end of said cover means;

second support means coupled to said second weir end for supporting said second end of said cover means, said second support means support having first and second ends, said first end secured to said second weir end of said launder channel, said second end provided with a pivot axis of rotation; and pivot means coupled to said second end of said second support means and to said panel member for pivoting said cover means about said pivot axis away from said tank between a first closed position and a second open position so as to allow access for cleaning of said launder channel.

* * * * *